United States Patent

Hirane

[11] Patent Number: 5,866,868
[45] Date of Patent: Feb. 2, 1999

[54] SPOT WELDING APPARATUS

[75] Inventor: Akio Hirane, 1-16-26, Midorigaoka, Meguro-ku, Tokyo, Japan

[73] Assignee: Akio Hirane, Tokyo, Japan

[21] Appl. No.: 881,859

[22] Filed: Jun. 24, 1997

[51] Int. Cl.⁶ .................................................. B23K 11/24
[52] U.S. Cl. ........................................ 219/110; 219/91.21
[58] Field of Search .................................... 219/110, 108, 219/117.1, 91.21

[56] References Cited

U.S. PATENT DOCUMENTS

| | | | |
|---|---|---|---|
| 3,538,293 | 11/1970 | Procacino | 219/110 |
| 4,072,843 | 2/1978 | Szabo | 219/91.21 |
| 4,675,494 | 6/1987 | Dilay | 219/110 |
| 5,272,306 | 12/1993 | Hirane | 219/110 |

FOREIGN PATENT DOCUMENTS 5-99274  4/1993  Japan .

*Primary Examiner*—Clifford C. Shaw
*Attorney, Agent, or Firm*—Banner & Witcoff Ltd.

[57] ABSTRACT

An object to the invention is to narrow the region burned by the preheating current at the spot welding. Structure is provided for allowing conventional welding current to be flowed between a first welding electrode tip and a contact member intermittently via an electronic switch until a predetermined current starts to flow between a first welding electrode tip and a second welding electrode tip.

3 Claims, 2 Drawing Sheets

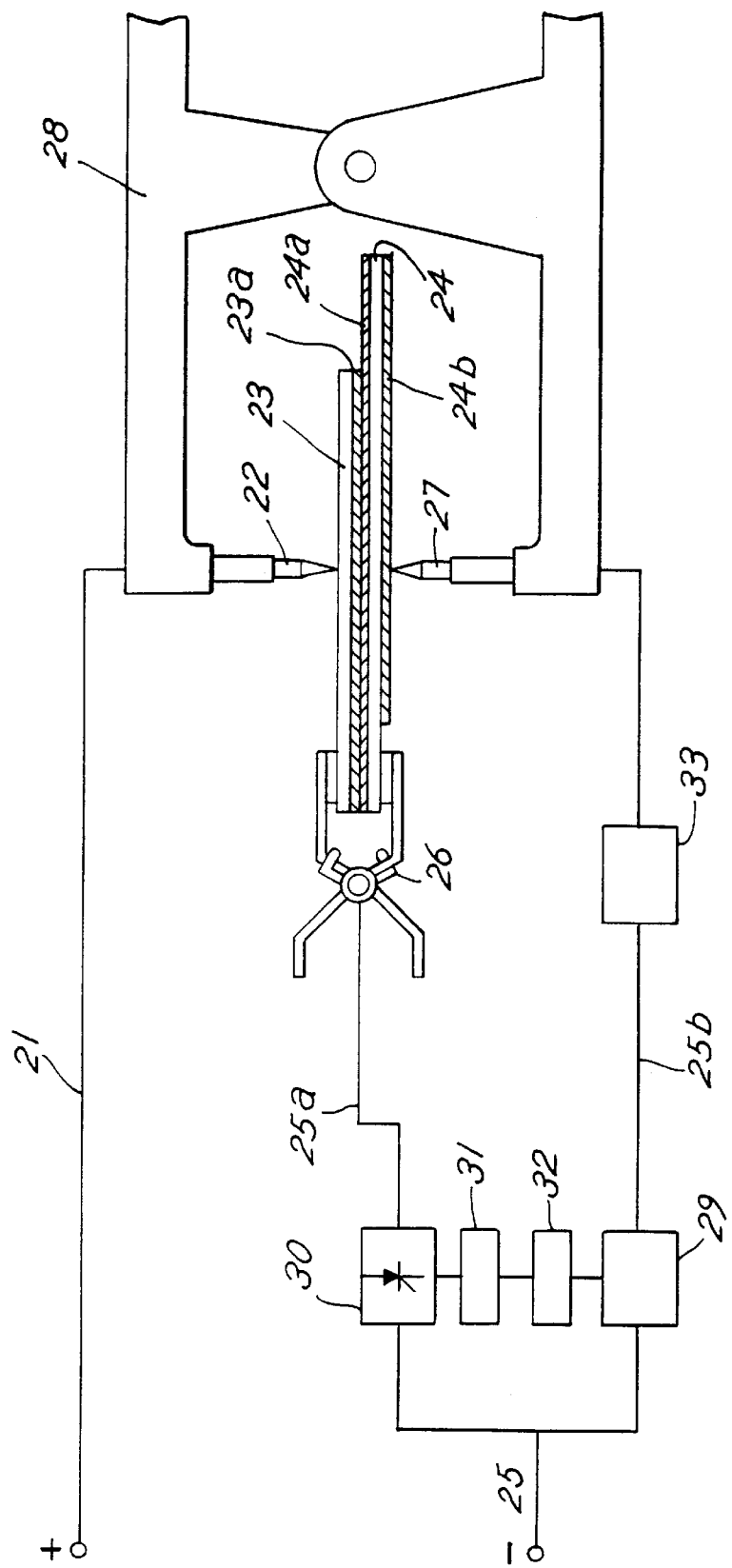

SPOT WELDING APPARATUS

BACKGROUND OF THE INVENTION

The present invention relates to a spot welding apparatus for spot-welding overlapped articles or workpieces to be welded, at least one of which has a coating on its outer surface. The spot welding apparatus according to the present invention comprises a welding power source for supplying a low-voltage, large-current welding energy, a first cable drawn from one pole of the welding power source, a first welding electrode tip connected to an end of said first cable, second and third cables connected to the other pole of the welding power source, a second welding electrode tip connected to an end of said third cable, and a contact member provided at an end of said second cable, said contact member contact-connecting to metal-exposed surfaces at portions of the articles to be welded which portions are spaced apart from a spot welding area of the overlapped articles to be welded.

PRIOR ART

FIG. 1 shows an example of the prior-art spot-welding apparatus of the above-mentioned type as disclosed in JP Patent Application Disclosure No. 5-92274. In this apparatus, a sheet metal panel 1 with a lower coating 1a and another sheet metal panel 2 with a second lower coating 2a are overlapped, a first welding electrode tip 3 contacts, by pressure, a spot welding area on the outer surface of the sheet metal panel 1, the first welding electrode tip 3 being connected to an end of a first cable connecting to one pole of the welding power source, a second welding electrode tip 4 pressure-contacts the spot welding area of the coating 2a on the other sheet metal panel 2 in an opposing manner with respect to the first welding electrode tip 3, the second welding electrode tip being connected to an end of a third cable connecting to the other pole of the welding power source, a contact member 5 is provided at an end of a second cable connected to the other pole of the welding power source, said contact member contact-connecting to metal-exposed surfaces at portions of the articles to be welded which portions are spaced apart from the spot welding area of the overlapped articles, a switch means 6 is provided in the second cable connecting to the contact member, the switch means 6 being adapted to be turned off depending on the result of detection by a current detection means 7 detecting the current flowing in the second welding electrode tip 4, and a timing circuit 8 is provided to regulate the time of current flow to the second welding electrode tip. In a welding operation by this known welding apparatus, a preheating current continuously flows from the positive pole to the negative pole of the welding power source via the welding electrode tip 3, article 1 to be welded, contact member 5 and switch means 6. As a result, the coating 1a at the welding area between the opposing electrode tips is heated and destroyed. This dielectric breakdown of the coating 1a allows a welding current to be flown between the articles 1 and 2 to be welded, i.e., from the positive pole to the negative pole of the welding power source via the welding electrode tip 3, articles 1 and 2 to be welded, contact member 5 and switch means 6. This flow of the welding current between the articles 1 and 2 heats, softens, evaporates and eventually burns the coating 2a at the welding area and its surrounding portion of the article 2, so that the pressed, second welding electrode tip 4 comes into electrical contact with the article 2 to be welded. And as current detector 7 detects a predetermined level of flow of the welding current between the welding electrode tips 3 and 4, the switch means 6 is turned off, thereby allowing the flow of welding current only between welding electrode tips 3 and 4 to effect a weld. According to this method, the preheating current flows from the welding electrode tip 3 to the contact member 5 in such a manner as to diffuse outwardly from the spot welding area in the article 1 to be welded. This method, while attaining better welds than could the previous methods in that the heated area due to the current flowing through resistance in the articles can be reduced, cannot yet provide satisfactory results. Furthermore, this method is associated with the problem that a mechanical distortion develops in the burned region adjacent the welded area in the articles to be welded.

It has been proposed, as a method of destroying the coating on the welding area, that a welding energy of not more than one three-thousandths the conventional welding current and one hundred times the conventional welding voltage be simply applied intermittently between the welding electrode tips 3 and 4, in order to remove the coating on the articles to be welded by voltage destruction, thereafter performing a weld by the conventional welding current of 3000 to 6000 ampere at 8 to 9 volts. According to this method, however, it is difficult to detect whether the coating has been fully destroyed. In addition, the necessary costs for generating the required high voltage can be considerable for circuit technology reasons, which is further aggravated by the fact that the high voltage can be the source of strong electromagnetic noise.

OBJECT OF THE INVENTION

An object of the invention is to provide a spot welding apparatus at low costs wherein the burned region due to the heat from the welded area is further reduced, the development of the mechanical distortion in the articles to be welded is prevented, and the generation of electromagnetic noise is avoided.

MEANS FOR ACHIEVING THE OBJECT

The above object of the invention is achieved by a spot welding apparatus comprising: a contact member contact connecting to metal-exposed surfaces at portions of the articles to be welded which portions are spaced apart from a spot welding area; an electronic switch disposed between the contact member and one pole of the welding power source; a means for causing a first welding electrode tip and a second welding electrode tip to come into contact by pressure with the spot welding area; a means for intermittently controlling the on/off of the said electronic switch such that conventional welding current flows intermittently and repeatedly at conventional welding voltage between the first welding electrode tip and the contact member until a predetermined current flows between the first welding electrode tip and the second welding electrode tip; a current detection means for detecting the flow of electric current between the first and second welding electrode tips; and a release means whereby the electronic switch can be opened depending on the result of detection by the said current detection means by releasing the on/off control means.

The intermittent current that flows between the first welding electrode and the contact member is preferably adjusted such that an on-period is in the range from 0.1 to 1 second and an off-period is in the range from 0.5 to 2 seconds.

BRIEF DESCRIPTION OF THE DRAWING

There is shown in the attached drawing a presently preferred embodiment of the invention; where:

FIG. 2 is a schematic view of the welding apparatus according to the present invention.

DETAILED DESCRIPTION OF THE INVENTION

Figure 1:
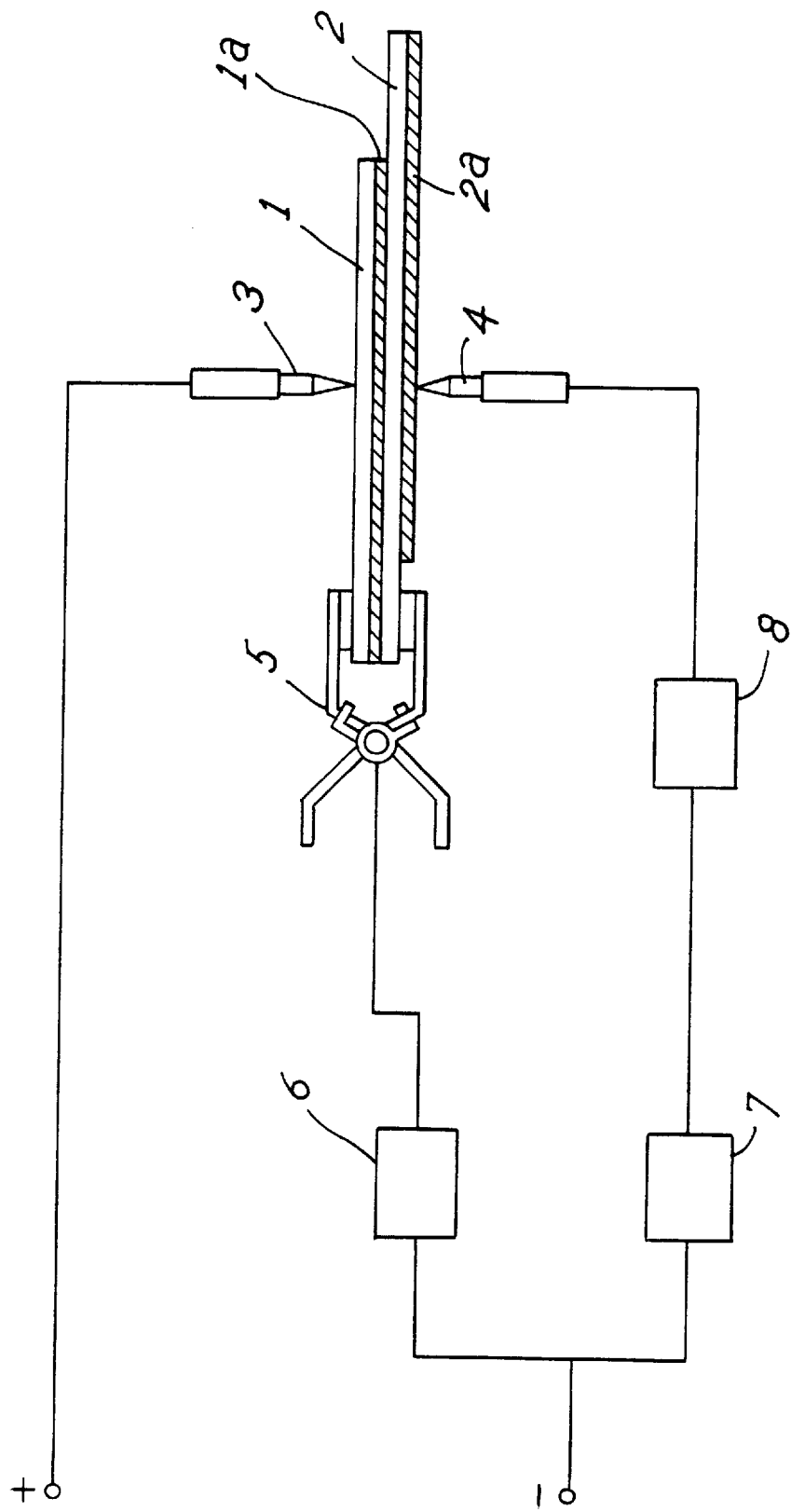
FIG. 1 is a schematic view of the known spot welding apparatus.

An embodiment of the invention will be explained in detail with reference to FIG. 2. Referring to FIG. 2, a plus cable 21 is connected to the plus terminal of a low-voltage, large-current welding power source. A first welding electrode tip 22 is connected to an end of the plus cable 21 and electronically connected by pressure contact to a metal-exposed surface of an article 23 to be welded. The article 23 has a coating 23a on its lower side and the other article 24 to be welded has coatings 24a and 24b on its either side.

Second and third cables 25a and 25b are separately connected to the minus terminal of the welding power source, or a primary cable 25 may be divided into two branch cables 25a and 25b. A contact clamp 26 as the contact member on the leading end of the cable 25a is electrically connected by contact to a metal exposed surface of at least one of the articles 23 and 24 at a point relatively far from the spot welding area. A second welding electrode tip 27 on the leading end of the other cable 25b is pressed against a coating 24b on the article 24 in an opposed relation to the first welding electrode tip 22. The articles to be welded are thus sandwiched between the welding electrode tips by means of a pressurizing mechanism 28. A current detector 29 is provided in the electric current path of the cable 25b. As the current detector, a current detection coil can be disposed around the cable 25b. A Hall element or a current transformer may be used as further alternatives as the current detector. In the electric current path of the cable 25a, there is disposed an electronic switch 30 comprised of, for example, a bipolar power transistor, a power MOSFET thyrister, a GTO thyristor, an electrostatic induction type transistor, or an electrostatic induction type thyristor.

An on/off control means 31 opens and closes the electronic switch 30 at such repetition period that the on-period is in the range from 0.1 to 1 second and the off-period is in the range from 0.5 to 2 seconds. The on/off control means is comprised of e.g. a pulse duty-factor adjustable pulse generator or a timer circuit. A release means 32 operates to open the electronic switch by releasing the function of the on/off control means when the current detector 29 detects the current flow in the cable 25b, which is connected to the second welding electrode tip 27, has exceeded a predetermined level. The release means 32 can be comprised as a threshold circuit in which the output of e.g. a current transformer or a Hall clement is amplified so that an output is produced when the amplified output exceeds a certain threshold value. A timing circuit 33 is provided to ensure that the current flow used for the main welding flows only for a predetermined period of time, which time is adjusted depending on the material of the article to be welded, its thickness and the like.

When performing a welding operation, the contact clamp 26 is fixedly mounted on metal-exposed surfaces at portions of the articles to be welded at a point which is relatively far from the spot welding area. The first electrode tip 22 and the second welding electrode tip 27 are positioned at the welding area. To the welding electrode tips are applied a pressure in the range from 30 kg to 50 kg, depending on the material of the article to be welded, by means of the pressurizing mechanism 28. Conventional welding current of 3500 to 6500A at voltages of 6 to 10 volts is supplied from the secondary winding of the welding power source. The electronic switch 30 is provided between the contact clamp 26 and the other pole, i.e., the minus pole in the example of FIG. 2, of the welding power source. The electronic switch 30 is repeatedly and intermittently controlled by the electronic switch on/off control means 31. The on-time and off-time are selected depending on the article to be welded and the secondary welding voltage and current. Preferably, however, the on-time is selected to be in the range from 0.1 to 1 second and the off-time in the range from 0.5 to 2 seconds. In FIG. 2, no welding current initially flows between the first electrode tip 22 and the second welding electrode tip 27 because of the coating 23a on the article 23 and the coatings 24a, 24b on the article 24. Instead, the conventional welding energy low in voltage and high in current flows intermittently and repeatedly from the plus terminal to the minus terminal of the welding power source via the cable 21, first welding electrode tip 22, article 23, contact clamp 26 and electronic switch 30. This intermittent current softens, burns and eventually destroys the coatings 23a and 24a on the articles 23 and 24, respectively, immediately below and adjacent the first welding electrode tip. The use of the intermittent current according to the present invention permits the heat-emitting region around the first welding electrode tip to be made considerably smaller than in the case of the conventional continuous current as shown in FIG. 1. The burned region correspondingly becomes smaller and, as a result, there can be obtained the surprising effect that the development of mechanical distortions in the article is minimized. After the destruction of the coatings 23a and 24a on the articles 23 and 24, respectively, the articles 23 and 24 become shorted so that electric current starts to flow from the plus pole terminal to the minus pole terminal of the welding power source via the cable 21, first welding electrode tip 22, article 23, article 24, contact clamp 26, cable 25b and electronic switch 30. Thus the current starts to flow intermittently in the article 24 as well, thereby heating the portion of the article 24 immediately below and adjacent the first welding electrode tip. As a result, the coating 24b at the heated region on the article 24 softens, gets burned and destroyed. In this case, too, the region which is heated and burned is much smaller than is the case according to the conventional method as illustrated in FIG. 1, and further the significant effect can be obtained that there develops little mechanical distortion in the article 24.

Following the destruction by burning of the coating 24b, a welding current for the main welding starts to flow from the first welding electrode tip to the second welding electrode tip pressed against the destructed area of the coating 24b on the article 24 via the articles 23 and 24. This welding current is detected by the current detector 29 so that as the detected current reaches a value suitable for welding, the electronic switch on/off control means 31 turns off the electronic switch by means of the release means 32, thereby completely cutting off the intermittent flow of current. Now that the current flow between the contact clamp 26 and the cable 25b is totally cut off, the welding current flows only between the first welding electrode tip 22 and the second welding electrode tip 27 via the articles 23 and 24, thereby increasing the welding efficiency. It should be noted that the coatings 23a, 24a, 24b on the articles are only exemplary and it is of course possible to carry out the present invention if only there is at least one of them.

Although the number of the cables connected to the minus pole of the welding power source is two in the above-described embodiment, the apparatus can be alternatively constructed such that the cable 21 is connected to the minus pole and the cables 25a and 25b are connected to the plus pole of the welding power source. Moreover, more than one cable can be connected to the contact clamp. it is also possible to provide in the embodiment of FIG. 2 a further contact clamp on the right hand side of the articles 23 and 24, with a further electronic switch disposed on the cable connecting to the further contact clamp which is likewise intermittently turned on/off.

Alternatively, AC power source may be employed as the low voltage, high-current welding power source.

EFFECTS OF THE INVENTION

According to the present invention, the burned region on the coating adjacent the main welding area where the first and second welding electrode tips contact in an opposing manner can be significantly reduced in comparison with the case of using the continuous preheating current, due to such configuration that the preheating current flown through the electronic switch in the current path leading to the contact member, which is electrically connected by contact to metal-exposed surfaces at portions of the articles to be welded which portions are spaced apart from the spot welding area on the overlapped articles, is repeatedly and intermittently controlled. Accordingly, the development of mechanical distortion in the articles to be welded can be reduced and welding defects such as perforation due to over-welding can be avoided, thereby improving the welding quality. Furthermore, there is no generation of electromagnetic noise. A quality welding can thus be performed at low costs.

While a presently preferred embodiment of the invention has been shown and described, it will be apparent to persons skilled in the art the invention may be otherwise embodied within the scope of the following claims: List of Numerals:
1, 2, 23, 24 . . . article to be welded
3, 22 first welding electrode tip
4, 27 second welding electrode tip
5 . . . contact member
6 . . . switch means
7, 29 . . . current detection means
8 . . . timing circuit
21, 25 . . . cable 23a, 24a, 24b . . . coating
26 . . . contact clamp
28 . . . pressurizing mechanism
30 . . . electronic switch
31 . . . electronic switch on/off control means
32 . . . release means

I claim:

1. A spot-welding apparatus for welding overlapped articles to be welded of which at least one has a coating on its surface, the apparatus comprising:
   a welding power source capable of generating a low-voltage, large-current energy;
   a cable drawn from one pole of said welding power source; a first welding electrode tip connected to an end of said cable;
   at least two cables connected to the other pole of said power source;
   a second welding electrode tip connected to an end of one of said at least two cables; and
   a contact member provided at an end of at least one remaining cable of the at least two cables to electrically connect to metal-exposed surfaces at portions of overlapped articles to be welded, said surface portions being spaced apart from a spot welding area, characterized in that there are further provided:
   an electronic switch disposed between said contact means and said other pole of the welding power source;
   a means for enabling the first welding electrode tip and the second welding electrode tip to contact under pressure the spot welding area on the articles to be welded;
   a means for intermittently controlling the on/off of said electronic switch such that conventional welding current is intermittently and repeatedly flowed at conventional welding voltage between the first welding electrode tip and said contact member until a predetermined current starts to flow between the first welding electrode tip and the second welding electrode tip;
   a current detection means for the detection of an electric current flowing between said first welding electrode tip and said second welding electrode tip; and
   a release means for opening the electronic switch by releasing the actuation of said on/off control means depending on the result of detection by said current detection means.

2. A spot welding apparatus according to claim 1, wherein the intermittent flow of the electric current between the first welding electrode and the contact member is adjusted such that an on-period is in the range from 0.1 to 1 second and an off period is in the range from 0.5 to 2 of said first cable, second and third cables connected to the other pole of the welding power source, a second welding electrode tip connected to an end of said third cable, and a contact member provided at an end of said second cable, said contact member contact-connecting to metal-exposed surfaces at portions of the articles to be welded which portions are spaced apart from a spot welding area of the overlapped articles to be welded.

3. A spot welding method comprising the steps of:
   fixedly mounting a contact means on metal-exposed surfaces at portions of articles to be welded at a point relatively far from the spot welding area;
   positioning a first welding electrode tip and a second welding electrode tip at the welding area, applying pressure to the tips and supplying a conventional welding current and voltage;
   flowing welding energy low in voltage and high in current intermittently and repeatedly from a plus terminal to a minus terminal of a welding power source for softening, burning, eventually destroying the coatings on the articles to be welded;
   flowing the electric current from the plus pole terminal to the minus pole terminal of the welding power source via a first cable, first welding electrode tip, a first article, a second article, contact means, a second cable and an electronic switch means; and
   detecting and completely cutting off the welding current when reaching a value suitable for welding so that it flows only between both welding electrode tips.

* * * * *